United States Patent [19]
Grotta

[11] 3,846,353
[45] Nov. 5, 1974

[54] NONTHROMBOGENIC PLASTIC MATERIAL AND METHOD FOR MAKING THE SAME

[75] Inventor: Henry M. Grotta, Delaware, Ohio

[73] Assignee: The United States of America as represented by the Secretary of the Department of Health, Education and Welfare, Washington, D.C.

[22] Filed: June 8, 1970

[21] Appl. No.: 44,594

[52] U.S. Cl............... 260/9, 117/47 A, 117/62.1, 117/138.8 B, 260/17.4 R, 260/17.4 BB, 424/183
[51] Int. Cl. ... A61k 17/18, B44d 5/12, C08b 25/00
[58] Field of Search ............. 260/211, 9; 424/183; 117/138.8

[56] References Cited
UNITED STATES PATENTS

| 3,617,344 | 11/1971 | Leininger et al.............. 117/118 |
|---|---|---|
| 3,634,123 | 1/1972 | Eriksson et al................ 424/183 |
| 3,755,218 | 8/1973 | Yen.............................. 117/138.8 E |
| 3,766,104 | 10/1973 | Lyon et al.................... 117/138.8 E |

OTHER PUBLICATIONS

Scott, J. E., "The Reaction of Long-Chain Quaternary NH4 Salts with Acidic Polysaccharides," Chemistry and Industry No. 7, Feb. 2, 1955, pp. 168–169 [TPI--S63].

Primary Examiner—William H. Short
Assistant Examiner—Edward Woodberry

[57] ABSTRACT

Novel water-insoluble, organic solvent-soluble, long chain alkyl quaternary ammonium salts of heparin, heparinized polymers made therewith, and the method of making the same are disclosed.

15 Claims, No Drawings

NONTHROMBOGENIC PLASTIC MATERIAL AND METHOD FOR MAKING THE SAME

This invention relates to nonthrombogenic plastics, and more particularly to plastics made nonthrombogenic by the use of a water-insoluble, organic solvent-soluble, long-chain alkyl quaternary ammonium salt of heparin.

It has been known for many years that a basic problem in the development of prostheses for intravascular replacement lies with the complicated processes occurring at the blood-graft interface. The addition of a solid foreign material to the blood stream results in clot formation on that material. This interface activity occurs no matter what the foreign material might be. Porous prosthetics have proven to be useful in the larger vessel, but have failed when adapted to the smaller artery. Certain non-porous materials have been used but also have demonstrated various disadvantages. Solid or imperforate materials are preferred in the field of artificial internal organ development. Pumping chambers, arteries, and materials for encompassing structures having moving parts would demand the property of elasticity as its constituent, prompting an additional requirement of the ideal vascular prosthetic material. It would also be advantageous if that same material could be varied in its elastic properties to the point of rigidity.

Naturally, polymers, both natural and synthetic, and particularly certain synthetic plastics have come to the fore as preferred materials for these prosthetics. Their major drawback, however, is their thrombogenicity. Even though plastics are used in various apparatus such as heart-lung machines, kidney machines, and artificial heart valves and patches, the tendency of these materials to cause coagulation necessitates the use of anticoagulants such as heparin. Even such plastics as Teflon (polytetrafluoraethylene) and the silicone rubbers which are more compatible with blood than most plastics, still show thrombogenic characteristics. The first real advance in the preparation of nonthrombogenic materials was described by Dr. Vincent Gott. The method used by Dr. Gott comprised treating a graphited surface first with Zephiran (benzalkonium chloride) and then with heparin. Materials treated in this way were nonthrombogenic in vivo for long periods of time. The major disadvantage, however, with these materials, was that the method could only be practiced on rigid plastics and a need still exists for a suitable flexible nonthrombogenic plastic, as well as a method of producing the same.

Various methods have been devised for producing such a material, most of which involve chemically bonding a quaternary ammonium salt to the polymer and then heparinizing the same. Usually, this is done by incorporating an amine in the polymer, quaternizing the amine, and then heparinizing the quaternized material. The disadvantages associated with these methods are numerous. The materials prepared by these methods have usually been satisfactory on a small laboratory scale, but could not easily be scaled up to a practical method. Furthermore, these methods were quite satisfactory for preparation and evaluation of individual polymers, the techniques varying from polymer to polymer. A major drawback, based on these differences in techniques, is that heparinization of a composite structure containing more than one type of polymer could not be easily done. Moreover, many of the techniques involve several steps requiring a variety of reagents, solvents, and reaction conditions. The present invention is designed to eliminate these various problems.

Accordingly, it is a primary object of the present invention to provide a nonthrombogenic plastic material which can be easily and efficiently made.

It is another primary object of the present invention to provide a composition for imparting nonthrombogenic characteristics to polymers.

If is yet another primary object of the present invention to provide a method for the production of nonthrombogenic plastic materials.

It is a further object of the present invention to provide a water-insoluble, organic solvent-soluble, long chain alkyl quaternary ammonium salt of heparin having nonthrombogenia properties.

It is another object of the present invention to provide polymers having a water-insoluble, organic solvent-soluble long chain alkyl quaternary ammonium salt of heparin incorporated therein to thereby provide said polymers with nonthrombogenic properties.

Other objects of the present invention will become apparent as the description thereof proceeds.

Consistent with the foregoing objects, a composition of matter comprising a water-insoluble, organic solvent-soluble, plastic-compatible, long chain alkyl quaternary ammonium salt of heparin is provided. The salt has 2 to 4 long chain alkyl groups attached to the nitrogen atom, the alkyl groups having from about 10 to about 30 carbon atoms. The alkyl groups can be like or unlike. These compounds are generally obtained by heating together a tertiary amine and an alkylating agent to thereby produce the quaternary ammonium salt. To produce the nonthrombogenic plastic, the polymer is exposed to the water-insoluble quaternary ammonium salt in an organic solvent after which it is dried and exposed to a solution of heparin. Such materials have been shown to possess in vitro and in vivo nonthrombogenic properties. Suitable polymers, for example, are the following:

Polyethylene
Polypropylene
Ployurethanes
Polycarbonates
Polystyrenes
Polytetrafluoroethylene
Silicone rubber
Polyesters
Nylons
Natural rubber
Polyvinyl chloride
Acrylics.

The novel nonthrombogenic plastics of the present invention are useful in a number of devices including cannulae, vena caval implants, counterpulsation balloons, tubing, and vascular prostheses.

The present invention is further illustrated by the following Examples, although it is not intended to be limited thereto.

EXAMPLE I

Tridodecylmethylammonium Chloride

Tridodecylmethylammonium chloride (TDMAC) was prepared according to the following scheme:

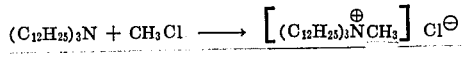

A suitable autoclave was loaded with tridodecylamine and then with at least a molar excess of methyl chloride. The two materials were heated together at 80° C. for approximately 4 hours. Excess methyl chloride was vented and the contents crystallized from petroleum ether. A white waxy solid melting at 60° C. was obtained in better than 90 percent yield.

EXAMPLE II

An alternate procedure consisting of heating tridodecylamine with an excess of methyl iodide at reflux temperature and ambient pressure was followed. The iodide salt is quite sensitive to oxidation and it is best to perform the reaction under an inert atmosphere. The iodide salt was stripped of excess methyl iodide and taken up in methyl alcohol. This solution was then passed through an ion exchange column packed with Dowex IX-8 (chloride form) using methyl alcohol as the liquid phase. The alcohol was evaporated and the TDMAC crystallized from petroleum ether.

EXAMPLE III

The procedure of Example 2 was followed in order to make tetradodecyl ammonium chloride. Tridodecylamine and dodecylbromide were heated together at least over night at temperatures of approximately 150° C. A solution of the bromide salt was then passed through an ion exchange column packed with Dowex IX-8. The resulting compound was recrystallized from tetrahydrofuran.

EXAMPLE IV 1,2-Ethylene bis-tridodecylammonium bromide was prepared as follows:

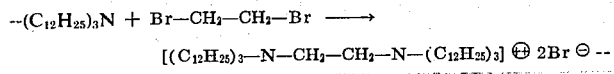

Following the procedure of Example I, the tridodecyl amine (Eastman) in excess and dibromoethane (Eastman) were heated together for about 100 hours at approximately 50° C. The compound was crystallized from tetrahydrofuran.

EXAMPLE V

The following scheme as in Example I was used to prepare tridodecyl benzylammonium chloride:

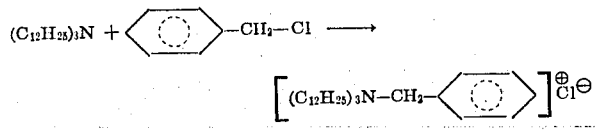

Tridodecyl amine was heated with an excess of benzyl chloride at approximately 150° C. for several hours. The resultant salt was crystallized from tetrahydrofuran.

EXAMPLE VI

The compound 1,5-Pentane bistridodecylammonium chloride was prepared according to the procedure of Example II:

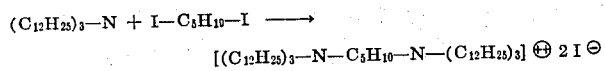

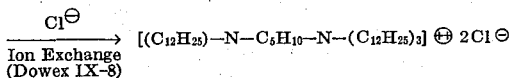

An excess of tridodecyl amine (Eastman) and 1,5-diiodopentane (Eastman) were heated together overnight at 150° C. The resulting compound was passed through an ion exchange column (chloride form of Dowex IX-8) using methyl alcohol as the medium and the compound was crystallized from tetrahydrofuran.

EXAMPLE VII

An oil soluble complex of heparin and TDMAC was prepared by vigorously shaking together a toluene or toluene/petroleum ether solution of TDMAC and a water solution of sodium heparinate. Weight ratios of TDMAC/Heparin ranging from 5:1 to 1:1 were used.

The complex which formed in the toluene phase was dried from the solvent and used as is to plasticize polymers as described more fully hereinbelow.

EXAMPLE VIII

Tridodecylmethyl ammonium iodide was prepared by the following procedure:

Tridodecylamine (13.3 g) and methyl iodide (58.4 g) were mixed and began to reflux exothermically. The mixture was cooled with ice for a few minutes and then allowed to reflux. The exothermic reaction lasted about 5 minutes. Thereafter, the mixture was heated and allowed to reflux for 1½ hours. Excess methyl iodide was evaporated on a rotary evaporator, thereby leaving a soft solid which was insoluble in water. The yellow solid was recrystallized from heptane to give a yellow solid which, after drying in a vacuum oven, resulted in 14.8 grams of a brown, waxy material.

EXAMPLE IX

Tridodecylmethylammonium nitrate was prepared by the following procedure:

Tridodecylmethylammonium iodide (14.8 g), as prepared by the method of Example VIII, was dissolved in 100 ml of ethanol. Silver nitrate (5.2 g), in excess of that theoretically needed, was dissolved in 150 ml of ethanol on refluxing. The hot silver nitrate solution was poured into the tridodecylmethylammonium iodide solution and, after digesting 4 minutes on a hotplate, the silver iodide precipitate was filtered off to give a clear, colorless solution. The silver iodide precipitate was rinsed twice with ethanol and the washings combined with the previous filtrate.

The solution was evaporated on a rotary evaporator leaving a viscous oil which had small particles of silver iodide suspended in it. The oil was taken into chloroform, filtered, and the filtrate was extracted four times with distilled water, reserving the water phase. The chloroform phase was filtered and then evaporated on a rotary evaporator. Ethanol was added several times to remove water, and finally stripped at 55° C for several hours to give 12.66 g of a white cheesey solid which was then dried in a vacuum oven at 50° C overnight.

EXAMPLE X

C¹⁴ Tagged TDMAC

In order to prepare tagged TDMAC, the following reaction scheme was followed:

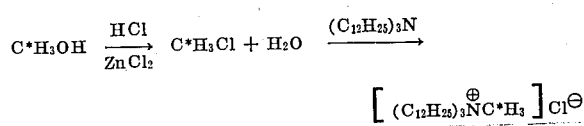

Labeled C*H₃OH was purchased from Nuclear—Chicago. The alcohol was refluxed with concentrated acid containing a catalytic concentration of zinc chloride. The off gases were trapped through a caustic tower to an acetone-Dry Ice bath. The synthesized C*H₃Cl was then loaded into an autoclave with an excess of tridodecylamine and heated to 80° C for 15 hours. At the end of this period, the autoclave was opened and recharged with unlabeled CH₃Cl in excess. This was then heated to 80°C for an additional 4 hours. The resultant TDMAC was crystallized once from petroleum ether and used.

EXAMPLE XI

An alternate scheme for preparation of tagged TDMAC gave better yields:

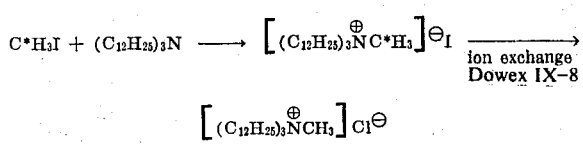

Labeled C*H₃I was purchased from Nuclear—Chicago. The iodide was refluxed with tridodecylamine (Eastman) for several hours and the iodide salt exchanged for chloride ion as outlined in the Example 10.

The tagged TDMAC was used in several tests described more fully hereinbelow.

EXAMPLE XII

Various polymers were treated to render them non-thrombogenic. The polymers treated were polyurethane, silicone rubber, polypropylene, polyethylene, polycarbonate, polyvinylchloride, polystyrene, polyesters such as Mylar, Teflon, nylon, methylmethacrylate and a copolymer of polycarbonate and silicone rubber. The method used, in each instance, was as follows:

The polymer was exposed to a 10 percent solution of the quaternary ammonium salt in either toluene, petroleum ether or a mixture of the two, for approximately 4 hours at 25° C. It should be clearly understood that any non-polar organic solvent could be used. The polymer was removed, dried, and then placed in a 0.25 percent solution of sodium heparinate in a solvent consisting of equal amounts of methanol and water for 4 hours. The treated polymer was then removed, dried, and tested for thrombogenicity.

EXAMPLE XIII 8 different polymers were treated with tridodecylmethylammonium chloride and heparin, generally following the procedure of Example XII. In order to more easily determine the properties of the treated polymers, ³⁵S-labeled heparin was used. In vitro tests were then made. The results are shown in Table 1.

TABLE 1

EVALUATION OF PROCEDURES (1) FOR THE HEPARINIZATION OF MATERIALS USING TRIDODECYLMETHYLAMMONIUM CHLORIDE (TDMAC)

| Materials | TDMAC EXPOSURE CONDITIONS | | Compatibility In Vitro, min. | Thickness (2) of bound heparin Initial A | Stability (3) percent remaining | After 3 hr in Plasma, percent remaining |
|---|---|---|---|---|---|---|
| | Solution Concentration | Temperature °C | | | | |
| Silicone Rubber | 1 | Ambient | No clot | 400 | 67 | — |
| Silicone Rubber | 3 | Ambient | do. | 1,100 | 91 | — |
| Silicone Rubber | 5 | Ambient | do. | 1,700 | 92 | — |
| Silicone Rubber | 7 | Ambient | do. | 2,200 | 91 | — |
| Silicone Rubber | 1 | 50 | do. | 400 | 81 | — |
| Silicone Rubber | 3 | 50 | do. | 1,100 | 93 | — |
| Silicone Rubber | 5 | 50 | do. | 1,800 | 95 | — |
| Silicone Rubber | 7 | 50 | do. | 2,200 | 94 | — |
| Polyurethane | 1 | Ambient | do. | 8,300 | 98 | 97 |
| Polyurethane | 3 | Ambient | do. | 15,400 | 100 | 96 |
| Polyurethane | 5 | Ambient | do. | 22,600 | 99 | 96 |
| Polyurethane | 7 | Ambient | do. | 18,600 | 100 | 98 |
| Polypropylene | 1 | Ambient | 18 | 30 | 52 | 82 |
| Polypropylene | 3 | Ambient | 25 | 85 | 87 | 81 |
| Polypropylene | 5 | Ambient | 35 | 300 | 33 | 84 |
| Polypropylene | 7 | Ambient | No clot | 820 | 92 | 91 |
| Polypropylene | 1 | 50 | 26 | 190 | 91 | 83 |
| Polypropylene | 3 | 50 | 26 | 710 | 93 | 89 |
| Polypropylene | 5 | 50 | No clot | 830 | 95 | 90 |
| Polypropylene | 7 | 50 | No clot | 1,500 | 95 | 99 |
| Polyethylene | 1 | Ambient | No clot | 500 | 94 | 94 |
| Polyethylene | 3 | Ambient | No clot | 1,500 | 100 | 95 |
| Polyethylene | 5 | Ambient | No clot | 1,700 | 100 | 95 |
| Polyethylene | 7 | Ambient | No clot | 2,500 | 100 | 94 |
| Polyethylene | 1 | 50 | No clot | 300 | 100 | 91 |
| Polyethylene | 3 | 50 | No clot | 700 | 98 | 92 |
| Polyethylene | 5 | 50 | No clot | 1,100 | 96 | 92 |

TABLE 1—Continued

EVALUATION OF PROCEDURES (1) FOR THE HEPARINIZATION OF MATERIALS USING TRIDODECYLMETHYLAMMONIUM CHLORIDE (TDMAC)

| Materials | TDMAC EXPOSURE CONDITIONS | | Compatibility In Vitro, min. | Thickness (2) of bound heparin Initial A | Stability (3) percent remaining | After 3 hr in Plasma, percent remaining |
|---|---|---|---|---|---|---|
| | Solution Concentration | Temperature °C | | | | |
| Polyethylene | 7 | 50 | No clot | 1,100 | 100 | 92 |
| Polyvinyl Chloride (Rigid) | 1 | Ambient | No clot | 700 | 95 | 100 |
| Polyvinyl Chloride | 3 | Ambient | No clot | 1,400 | 88 | 94 |
| Polyvinyl Chloride | 5 | Ambient | No clot | 2,900 | 100 | 96 |
| Polyvinyl Chloride | 7 | Ambient | No clot | 2,500 | 100 | 95 |
| Polyvinyl Chloride | 1 | 50 | No clot | 100 | 100 | 63 |
| Polyvinyl Chloride | 3 | 50 | No clot | 400 | 100 | 85 |
| Polyvinyl Chloride | 5 | 50 | No clot | 1,200 | 100 | 88 |
| Polyvinyl Chloride | 7 | 50 | No clot | 500 | 95 | 86 |
| Polycarbonate | 1 | Ambient | No clot | 700 | 100 | 86 |
| Polycarbonate | 3 | Ambient | No clot | 600 | 93 | 88 |
| Polycarbonate | 5 | Ambient | No clot | 700 | 48 | 89 |
| Polycarbonate | 7 | Ambient | No clot | 400 | 93 | 90 |
| Polycarbonate | 1 | 50 | No clot | 400 | 84 | 88 |
| Polycarbonate | 3 | 50 | No clot | 500 | 93 | 88 |
| Polycarbonate | 5 | 50 | No clot | 1,100 | 100 | 91 |
| Polycarbonate | 7 | 50 | No clot | 1,800 | 98 | 89 |
| Mylar | 1 | Ambient | 25 | 225 | 91 | 85 |
| Mylar | 3 | Ambient | No clot | 960 | 92 | 91 |
| Mylar | 5 | Ambient | No clot | 1,030 | 93 | 91 |
| Mylar | 7 | Ambient | No clot | 1,800 | 95 | 90 |
| Mylar | 1 | 50 | No clot | 500 | 93 | 78 |
| Mylar | 3 | 50 | No clot | 2,200 | 94 | 79 |
| Mylar | 5 | 50 | No clot | 3,900 | 95 | 88 |
| Mylar | 7 | 50 | No clot | 5,250 | 95 | 78 |
| Teflon | 1 | Ambient | 20 | 40 | 89 | 78 |
| Teflon | 3 | Ambient | 40 | 90 | 93 | 85 |
| Teflon | 5 | Ambient | 30 | 80 | 89 | 60 |
| Teflon | 7 | Ambient | 35 | 130 | 89 | 86 |
| Teflon | 1 | 50 | 18 | 30 | 88 | 84 |
| Teflon | 3 | 50 | 24 | 50 | 95 | 86 |
| Teflon | 5 | 50 | 26 | 80 | 99 | 79 |
| Teflon | 7 | 50 | 31 | 110 | 99 | 87 |
| Teflon | 3 | 100 | No clot | 6,900 | 96 | — |
| Teflon | 7 | 100 | No clot | 9,500 | 100 | — |

(1) Common procedure in all cases involved a 3-hour exposure to a toluene/petroleum ether solution of TDMAC. Heparinization accomplished at ambient temperature using ¼ percent heparin in 50/50 MeOH/H$_2$O.
(2) Measured using $^{35}$S labeled heparin and assuming a density of 1.0 for the heparin coating.
(3) Percent $^{35}$S labeled heparin present after exposure to 37 C flowing physiological saline for 100 hours.

It can be seen that in each case, with the exception of polycarbonates, the greater concentration of TDMAC in the organic solvent produced greater heparin layer thickness. In general, temperature increases also produced substantial increases in amounts of finally bonded heparin. A 50/50 mixture of toluene/petroleum ether proved to be a preferred solvent system because of the ease with which it could be subsequently eliminated from treated objects. Other organic solvents could, of course, be used.

It can also be seen that large quantities of heparin can be bound at the surface of a large variety of materials. This great amount of heparin appears to be quite strongly bonded as evidenced by the exceptionally good stability to normal saline (100 hours) and plasma (3 hours). Retention of greater than 90 percent of the originally bonded heparin can be attained with all of the materials evaluated.

EXAMPLE XIV

Microscopic examination of TDMAC-heparin treated silicone rubber surfaces revealed that gross quantities of the TDMAC were deposited thereby causing surface roughness. Removal of this gross deposit was attempted by selective solvent extraction before heparinization. Solvent systems investigated included: methanol, ethanol, acetone, formamide and petroleum ether. The treatment consisted in steeping silicone rubber materials in a 7 percent TDMAC solution. The samples were dried, exposed to the various solvents for one-half hour, and then heparinized in a 75/25 methyl alcohol/heparin solution (0.25 percent heparin). Table 2 shows how much heparin was adsorbed by TDMAC surfaces so treated and the stability of said surfaces to saline and plasma.

TABLE 2

SELECTED SOLVENT TREATMENT OF TDMAC SURFACES

| Solvent | Compatibility, min | Heparin Thickness | | |
|---|---|---|---|---|
| | | Initial, A | After 100 Hr. in Saline, percent remaining | After 3 Hr. in Plasma, percent remaining |
| Methanol | 30 | 400 | 57 | 47 |
| Ethanol | 16 | 200 | 67 | 54 |

TABLE 2—Continued

SELECTED SOLVENT TREATMENT OF TDMAC SURFACES

| Solvent | Compatibility, min | Heparin Thickness Initial, A | After 100 Hr. in Saline, percent remaining | After 3 Hr. in Plasma, percent remaining |
|---|---|---|---|---|
| Acetone | 21 | 200 | 61 | 55 |
| Formamide | No clot | 800 | 70 | 46 |
| Petroleum ether | 45 | 550 | 77 | 48 |

It is evident from this Table that this technique deleteriously affects not only the compatibility of the treated surface (with the exception of the formamide rinse), but also the environmental stability of the surface. These failures are possibly attributable to certain physical properties of TDMAC, particularly its soft, waxy nature. Presumably, the material is eroded mechanically under body conditions, 37° C, and in environment of high turbulence within the vascular system.

EXAMPLE XV

To confirm the hypothesis that the material is eroded mechanically, "treated plastic flags" were subjected to an environment of flowing saline solution at 37° C. For these experiments, "flags" approximately 16 × 20 mm were prepared and then treated with $^{35}S$ or $^{3}H$ radiolabeled heparin, or $^{14}C$ labeled TDMAC as prepared in Examples X or XI. The data obtained with the $^{35}S$-labeled heparin patches is set forth in Table 3.

TABLE 3

IN VITRO STABILITY OF TDMAC TREATED SURFACES TO FLOWING SALINE AT 37 C

| Material and Treatment | Heparin Thickness Initial, A | After 100 hr Exposure, A | Percent Remaining |
|---|---|---|---|
| Silicone rubber (Unrinsed) | 4850 | 3600 | 75 |
| Silicone rubber (Formamide rinsed) | 880 | 690 | 78 |
| Polypropylene (Unrised) | 1580 | 950 | 60 |
| Polypropylene (Formamide rinsed) | 155 | 180 | 100 |

It is clear from these data that greater quantities of heparin are lost from exposure to turbulent flow of saline than that from static in vitro exposure normally employed.

EXAMPLE XVI

Solution applied coatings which can be later heparinized were easily prepared from TDMAC and polyurethane. The solutions consisted of approximately 90 percent polyurethane (coating grade) and 10 percent TDMAC dissolved in a mutual solvent, such as tetrahydrofuran. Solids content of the coating solution was kept at approximately 10 percent. Aluminum disks were coated with the above material, dried, then exposed to 0.25 percent heparin solutions in 50/50 methyl alcohol/water. Materials heparinized this way did not produce clots during 60 minutes in our modified Lee-White clotting test. The addition of thromboplastin at the end of this period produced clots within 60 seconds, thereby indicating that no appreciable quantities of heparin were extracted by the blood during the test period. Parallel experiments with $^{35}S$-labeled heparin indicated that a layer of heparin approximately 5,400 A was present at the surface. Stability tests indicated that 98 percent of the heparin remained after exposure of the surfaces to isotonic saline for 100 hrs. and 82 percent after exposure to blood plasma for 4 hrs. Nevertheless, heparin coatings 4,400 A thick are still adequate for nonthrombogenic effects.

EXAMPLE XVII

In an effort to determine the chemical nature of the TDMAC/heparin surface, an investigation was undertaken to determine amounts of each substance (TDMAC and heparin) present at the surface of a material such as silicone rubber when treated via the process of this invention. To accomplish this, $^{14}C$ labeled TDMAC and $^{35}S$ labeled heparin were used. It was determined that approximately 30 moles of TDMAC per tetrasaccharide unit of heparin is present at the surface.

EXAMPLE XVIII

Plasma was passed over a radiolabeled heparinized surface TDMAC surface and the eluate analyzed. Small quantities of heparin were removed (2–4 mg./ml.). However, the amounts were insufficient to constitute an anticoagulant level of heparin in the blood (<25 µg./ml.). There also was an increase in eluted heparin when saline followed the plasma flows. This has been a consistent observation using this technique.

To further investigate the cause of the eluted heparin in the saline fractions, the experiment was repeated with $^{14}C$ labeled TDMAC. The TDMAC-heparin complex was removed in small quantities (20–40 µg./ml.) by the plasma. Removal essentially stopped when saline followed the plasma flows. However, 4 N sodium chloride solution caused elution of substantial quantities of $^{14}C$ labeled material.

The ratio of heparin tetrasaccharide units to TDMAC and $^{35}S$ labeled heparin was 1:21. These results are in line with previous work using other quaternary ammonium binding salts and suggests that steric factors may limit the amount of heparin which is bound at the surface of materials.

Very dramatic effects of TDMAC surfaces on lipids and lipoproteins were detected in initial plasma fractions which contacted these surfaces. These effects are illustrative of the general trend for individual components such as cholesterol, fatty acids, phospholipids, triglycerides, and α and β lipoproteins. These data strongly suggest that the greatest interactions occur with surfaces containing high concentrations of pure TDMAC. The heparinization of these surfaces lowered the adverse effects substantially. Washing the heparinized surface with a solvent for TDMAC such as formamide or alcohol reduced these interactions even further.

EXAMPLE XIX

The effect of TDMAC surfaces on platelet adsorption, aggregation, and disruption was also studied. Table 4 contains the data on platelet aggregation.

As shown in Table 4, aggregation is most severe when platelets were exposed to surfaces containing excesses of the TDMAC. These data are in line with what was expected. The greater the quantities of free quaternary ammonium salts (positive surfaces) used, the greater the aggregation produced. However, these results do not present the whole picture, since they do not indicate the quantities of adsorbed platelets. Platelets were adsorbed in all cases and this is shown in Table 5. Tables 6 and 7 indicate levels of acid phosphatases and platelet factor III which were released into the plasma by ruptured platelets. As indicated from these Tables, platelet rupture was minimal where precautions were taken to remove excess quantities of TDMAC.

TABLE 6

RELEASE OF PLATELET RICH PLASMA ACID PHOSPHATASE* SUBSEQUENT TO SURFACE EXPOSURE

| Fraction No. | mU+ Acid Phosphatase/ml. pfp. | | |
|---|---|---|---|
| | No. 13 Pure TDMAC | No. 8 Hep. TDMAC | No. 16 Hep. TDMAC Form. Rinse |
| Standard | 3.7 | 6.3 | 4.9 |
| 5 | 1.2 | 5.5 | 1.1 |
| 10 | 4.8 | 8.9 | 6.8 |
| 15 | 10.4 | 6.4 | 5.1 |
| 20 | 7.7 | 5.1 | 5.2 |
| 25 | 1.2 | 6.6 | 5.0 |
| 30 | 0.9 | 4.5 | 5.0 |
| 35 | 5.8 | 6.7 | 4.7 |
| 40 | 2.1 | 6.4 | 4.4 |
| 45 | — | 6.8 | 5.2 |
| 50 Norm | — | 4.5 | 1.6 |

* Done by Boehringer-Mannheim Reagents
+ mU - Amount of enzyme required to convert 1 $\mu$ mole of substrate/min at 30° C.

TABLE 4

AGGREGATION OF PLATELETS (1) EXPOSED TO TDMAC SURFACES

| Fraction Numbers | Percent Particles in Individual Platelet and Aggregated Platelet Size Ranges (3) | | | | | |
|---|---|---|---|---|---|---|
| | TDMAC | | Hep. - TDMAC | | Heparinized TDMAC - Washed | |
| | Ind. | Agg. | Ind. | Agg. | Ind. | Agg. |
| Standard Platelet rich plasma | 98.8 | 1.3 | 99.0 | 0.8 | 99.2 | 0.8 |
| 5 | 92.7 | 7.3 | 82.2 | 17.7 | 99.1 | 0.9 |
| 10 | 93.8 | 6.2 | 98.3 | 1.6 | 98.9 | 1.1 |
| 15 | 92.1 | 7.9 | 99.3 | 0.7 | 98.7 | 1.1 |
| 20 | 84.1 | 16.2 | 99.3 | 0.6 | 98.9 | 1.1 |
| 25 | 95.8 | 4.1 | — | — | 98.6 | 1.8 |
| 30 | 99.0 | 1.0 | 99.5 | 0.5 | 98.4 | 1.5 |
| 35 | 98.9 | 1.1 | — | — | 98.2 | 1.8 |
| 40 | 98.1 | 1.8 | 99.4 | 0.6 | 97.6 | 2.5 |
| 45 | 91.8 | 8.2 | — | — | 95.3 | 4.7 |
| 50 | — | — | 99.2 | 0.7 | 96.6 | 3.4 |
| 55 | — | — | 98.3 | 1.6 | — | — |

TABLE 5

PLATELET ADSORPTION* OF SELECTED PLATELET-RICH PLASMA FRACTIONS SUBSEQUENT TO EXPOSURE

| Fraction Numbers | Platelets/mm.³ | | |
|---|---|---|---|
| | Column 13 Pure TDMAC | Column 8 Hep. –TDMAC | Column 16+ Hep. TDMAC |
| Standard | 403,000 | 543,000 | 638,000 |
| 5 | 19,000 | 97,000 | 511,000 |
| 10 | 15,000 | 298,000 | 594,000 |
| 15 | 8,000 | 470,000 | 622,000 |
| 20 | 8,000 | 486,000 | 561,000 |
| 25 | 66,000 | — | 540,000 |
| 30 | 360,000 | 494,000 | 576,000 |
| 35 | 369,000 | — | 585,000 |
| 40 | 69,000 | 514,000 | 540,000 |
| 45 | — | — | — |
| 50 | — | 540,000 | — |
| 55 | — | — | — |

* Detected by Coulter Counter.
+ TDMAC silicone rubber with formamide rinse.
Some dilution from the initial saline flows was obvious in this fraction

TABLE 7

STYPVEN CLOTTING TIMES (PF III) OF PLATELET-POOR PLASMA* FOLLOWING EXPOSURE TO TREATED SILICONE

| Fraction No. | Clotting Time (seconds) of 1:10 Dilution | | |
|---|---|---|---|
| | No. 13 Pure TDMAC | No. 35 Hep. TDAB | No. 16 Hep. TDMAC Form. Rinse |
| Standard | 95 | 100 | 90 |
| 5 | 105 | 60 | 100 |
| 10 | — | 60 | 90 |
| 15 | 115 | 85 | 85 |
| 20 | 105 | 85 | 85 |
| 25 | 95 | 85 | 95 |
| 30 | 90 | 90 | 90 |
| 35 | 90 | 85 | 85 |
| 40 | 105 | 70 | 75 |
| 45 | — | 85 | 85 |
| 50 | — | — | 85 |
| Lysed prep control | 30 | 30 | 25 |

* Platelet-poor plasma spun after exposure prior to assays.
TDAB is tetradodecylammonium bromide.

EXAMPLE XX

In addition to studies on the effect of TDMAC surfaces on platelets, levels of selected clotting factors were determined. A summary of the prothrombin and partial thromboplastin times are included in Table 8. As shown in this Table, extrinsic factors were affected in initial fractions of plasma contacting TDMAC surfaces. However, the levels soon returned to normal. The intrinsic system was affected when plasma contacted other surfaces such as glass or heparinized silicone rubber via another route.

The control surfaces, all of which were completely occluded, are not shown in this Table. These results demonstrate the pronounced nonthrombogenicity of TDMAC heparinized materials.

TABLE 9

RESULTS OF THROMBUS FORMATION ON VENA CAVAL IMPLANT RINGS COATED WITH TDMAC-HEPARIN

| Material | Date of Implant | Sterilization | Amount of Thrombus in Lumen | Comments |
|---|---|---|---|---|
| TDMAC Heparin | 11-2-67 | TDMAC | O | CLEAR |
| do. | do. | do. | O | CLEAR |
| do. | 11-6-67 | do. | O | CLEAR |
| do. | 11-10-67 | do. | O | Sacrificed after 2 weeks - clear |
| do. | 11-28-67 | do. | O | do. |
| do. | do. | do. | O | do. |
| do. | 11-30-67 | do. | O | do. |
| do. | 1-19-68 | do. | O | do. |

TABLE 8

PLASMA* CLOTTING FACTOR MEASUREMENT SUBSEQUENT TO EXPOSURE OF PLASMA TO VARIOUS SURFACES

| | | Clotting Tests - Clotting Times+, Seconds | |
|---|---|---|---|
| Column | Fraction No. | Prothrombin Time (PT) | Partial Thromboplastin Time (PTT) |
| 35 Glass Beads | Std | 14.0 | 67.0 |
| | 5 | 11.0 | No clot |
| | 10 | 12.0 | No clot |
| | 15 | 12.0 | No clot |
| | 20 | 11.5 | No clot |
| | 25 | 12.0 | No clot |
| | 30 | 13.0 | No clot |
| | 34 | 20.0 | No clot |
| 38 Silicone Rubber Heparinized TDMAC | Std | 11.0 | 73.5 |
| | 3 | No clot | No clot |
| | 5 | No clot | No clot |
| | 10 | 42.0 | No clot |
| | 15 | 24.0 | No clot |
| | 20 | 14.0 | 85.0 |
| | 25 | 15.0 | 88.0 |
| | 30 | 12.5 | 104.0 |
| | 35 | 12.5 | 110.0 |
| | 40 | 13.0 | 77.0 |
| | 44 | 13.0 | 68.0 |
| | 45 | 13.0 | 80.0 |
| 39 Silicone rubber polystyrene graft, chloromethylated aminated heparinized | Std | 14.0 | 68.0 |
| | 5 | 14.0 | No clot |
| | 10 | 11.0 | No clot |
| | 15 | 13.0 | 82.0 |
| | 20 | 12.0 | 109.0 |
| | 25 | 12.0 | No clot |
| | 30 | 12.0 | No clot |
| | 35 | 12.0 | No clot |
| | 37 | 12.0 | No clot |

* Platelet-free plasma prepared from ACD whole blood.
+ Average of 2-4 tests/sample.

EXAMPLE XXI

Acute and chronic tests of the in vivo performance of TDMAC heparinized surfaces indicate the method to be very promising. Table 9 shows the results of the vena caval ring implant tests.

EXAMPLE XXII

The work on the use of water insoluble quaternary ammonium salts with heparin was extended from TDMAC to other structurally similar compounds. Included in this examination were tetradodecylammonium chloride and bromide, tridodecylbenzylammonium chloride, 1,2-ethylene bis-tridodecylammonium bromide, and 1,5-pentane bis-tridodecylammonium chloride. Table 10 indicates some preliminary data which was obtained on these salts.

TABLE 10

CHARACTERISTICS OF SILICONE RUBBER SURFACES IMPREGNATED WITH VARIOUS QUATERNARY AMMONIUM SALTS

| Salt [1] | Thickness [2] of Bound Heparin. Å | Stability [3] (% remaining) | Clotting Time [4] |
|---|---|---|---|
| Tetradodecylammonium bromide | 11,000 | 82 | NC/NC |
| Tetradodecylammonium chloride | 560 | — | NC/NC |
| 1,2-Ethylene bis-tridodecylammonium bromide | 2,000 | 3 | NC/NC |
| Tridodecylbenzyl-ammonium chloride | 900 | 10 | NC/NC |
| 1,5-Pentane bistridodecyl-ammonium chloride | 2,400 | 81 | NC/60 |

[1] Silicone rubber impregnated with a solution of the salt (10%) in tetrahydrofuran or 50/50 toluene/methyl alcohol.
[2] Measured using $^{35}S$ labeled heparin and assuming a density of 1.0 for the heparin coating.
[3] Percent $^{35}S$ labeled heparin present after exposure to 37 C flowing physiological saline for 100 hours.
[4] Measured using modified Lee-White coagulation tests. NC - no clot after 60 min. of testing. Second NC indicates no clot after addition of thromboplastin; 60 indicates a clot formed within 60 seconds after addition.

These materials were tested in vitro with flowing plasma as well as saline. The elution of bound heparin by plasma is somewhat higher (6–20 μg/cc) than the TDMAC surfaces described earlier, and is sufficient to anticoagulate the blood. This conclusion is supported by our in vitro coagulation test. Whole blood contacted for one hour with these surfaces does not produce a clot upon the addition of two drops of thromboplastin. Blood contacting a surface heparinized by means of the 1,5 difunctional salt does clot on the addition of thromboplastin, indicating no significant elution of heparin by the blood.

EXAMPLE XXIII

Various polymers were treated with tridocecylmethylammonium nitrate (TDMAN) in the same manner as previously treated with TDMAC. The results are shown in Table 11.

TABLE 11

NONTHROMBOGENIC PROPERTIES OF MATERIALS HEPARINIZED [a] WITH TDMAN [b]

| Material | Blood Compatibility [c] | |
|---|---|---|
| | Clotting Time, minutes | Thromboplastin Time, seconds |
| Silicone rubber | NC | 35 |
| Polyurethane rubber | NC | 20 |
| Polypropylene | NC | 40 |
| Teflon | NC | 20 |
| Mylar | NC | 40 |
| Polyvinyl chloride | NC | 30 |
| Aluminum | NC | 35 |

[a] All materials were soaked in a 10% toluene solution of TDMAN, dried, then heparinized using 0.25% heparin in 1:1 methyl alcohol:water.
[b] Tridodecylammonium nitrate.
[c] Per modified Lee-White coagulation test; NC - no clot in 60 minutes.

EXAMPLE XXIV

TDMAC-heparin complexes as prepared by the method of Example VII were used to plasticize silicone rubber. Complexes containing varying ratios of TDMAC to heparin were used. The results of in vitro clotting tests are shown in Table 12.

TABLE 12

OLEOPHILIC HERRIN/TDMAC COMPLEX FORMATION

| TDMAC/Heparin Ratio | Agitation Time [1] min. | Complex Yield, % | Heparin Content % | Clotting Time [2] min/sec. |
|---|---|---|---|---|
| 5/1 | 1 | 94 | 17 | 16/- |
| 5/1 | 10 | 95 | 17 | 16/ |
| 3.6/1 | 1 | 70 | 30 | NC/NC |
| 2.5/1 | 1 | 86 | 31 | NC/NC |
| 1.7/1 | 1 | 76 | 39 | NC/NC |
| 1.7/1 | 30 | 76 | 48 | NC/NC |
| 1/1 | 1 | 62 | 40 | NC/NC |

[1] TDMAC dissolved in a 50/50 mixture of toluene/petroleum ether was shaken with a water solution of heparin in a separatory funnel.
[2] Silicone rubber impregnated with a 7% solution of the complex then dried. Recalcified whole human blood was then contacted for 1 hr. after which thromboplastin was added. NC = no clot.

From this Table it can be seen that a silicone rubber impregnated with a complex having a heparin content of about 30 percent would perform as a nonthrombogenic surface. The failure of contacted blood to clot after the thromboplastin is added indicates that some heparin is being leached from the surface of the material. In order to determine the extent of heparin elution, an $^{35}S$-tagged heparin complex was prepared and exposed to water and to blood plasma in our standard elution test. After a 100-hour exposure to water, 96 percent of the heparin remained, and after a 3-hour exposure to blood plasma, 90 percent was retained. When the coagulation test was re-run, using platelet rich plasma in place of whole blood, a control silicone rubber surface caused the plasma to clot after 20 minutes of exposure. The complex treated disks did not clot after 1 hour of exposure, but did clot within 60 seconds after the addition of thromboplastin. This suggests that a component of whole blood not present in platelet rich plasma is the eluting agent.

It will now be apparent from the foregoing detailed description that the objects set forth at the outset of this specification have been successfully achieved through utilization of the present invention. While there is shown and described a present preferred embodiment of the invention, it is to be distinctly understood that the invention is not limited thereto, but may be otherwise variously embodied and practiced within the scope of the following claims.

What is claimed is:

1. A method of making a nonthrombogenic plastic material comprising the steps of exposing a polymeric plastic to an organic solvent solution of water-insoluble, organic solvent-soluble, plastic-compatible long chain alkyl quaternary ammonium salt at ambient temperature, said long-chain alkyl quaternary ammonium salt having from 2 to 4 alkyl groups each having from about 10 to about 30 carbon atoms, and thereafter exposing said polymer to a solution of heparin at ambient temperature.

2. The method of claim 1, wherein said 2 to 4 alkyl groups have 12 carbon atoms.

3. The method of claim 2, wherein said quaternary ammonium salt is selected from the group consisting of tridodecylmethyl ammonium salts, tetradodecyl ammonium salts, 1,2-ethylene-bis-tridodecyl ammonium salts, tridodecylbenzyl ammonium salts, and 1,5-pentane-bis-tridodecyl ammonium salts.

4. The method of claim 1, wherein said plastic is a member of the group consisting of polyethylene, polypropylene, polyurethanes, polycarbonates, polytetrafluoroethylene, silicone rubber, polyesters, nylons, natural rubber, polyvinyl chloride, acrylics, polystyrene, and a copolymer of polycarbonate and silicone rubber.

5. The method of claim 1, wherein said organic solvent solution of said quaternary ammonium salt is a 10 percent solution.

6. The method of claim 5, wherein said organic solvent is selected from the group consisting of toluene, petroleum ether, and mixtures thereof.

7. The method of claim 1, wherein said plastic is exposed to said organic solvent solution for from about 3 to about 4 hours.

8. The method of claim 1, wherein said solution of heparin is a 0.25 percent solution of sodium heparinate.

9. The method of claim 8, wherein said sodium heparinate is dissolved in a mixture of methanol and water.

10. The method of claim 1 wherein said plastic is exposed to said solution of heparin for about 4 hours.

11. The method of claim 1, wherein said plastic is dried subsequent to being exposed to said solution of quaternary ammonium salt and prior to being exposed to said solution of heparin.

12. A nonthrombogenic plastic material having incorporated therein a complex of heparin and a water-insoluble, solvent-soluble, plastic-compatible long chain alkyl quaternary ammonium salt applied by the method of claim 1.

13. A plastic material according to claim 12, wherein said 2 to 4 alkyl groups have 12 carbon atoms.

14. A plastic material according to claim 13, wherein said quaternary ammonium salt is selected from the group consisting of tridodecylmethyl ammonium salts, tetradodecyl ammonium salts, 1,2-ethylene-bis-tridodecyl ammonium salts, tridodecylbenzyl ammonium salts, and 1,5-pentane-bis-tridodecyl ammonium salts.

15. A plastic material according to claim 12, wherein said plastic is a member of the group consisting of polyethylene, polypropylene, polyurethanes, polycarbonates, polytetrafluoroethylene, silicone rubber, polyesters, nylons, natural rubber, polyvinyl chloride, acrylics, polystyrene, and a copolymer of polycarbonate and silicone rubber.

* * * * *